United States Patent
Zhang et al.

(10) Patent No.: US 10,614,299 B2
(45) Date of Patent: Apr. 7, 2020

(54) INDOOR IDENTIFICATION OF INDIVIDUALS THROUGH FOOTSTEP INDUCED STRUCTURAL VIBRATION

(71) Applicant: CARNEGIE MELLON UNIVERSITY, Pittsburgh, PA (US)

(72) Inventors: Pei Zhang, Mountain View, CA (US); Hae Young Noh, Pittsburgh, PA (US); Shijia Pan, Sunnyvale, CA (US); Ningning Wang, Sunnyvale, CA (US); Amelie Bonde, East Palo Alto, CA (US); Mostafa Mirshekari, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 280 days.

(21) Appl. No.: 15/544,928

(22) PCT Filed: Feb. 9, 2016

(86) PCT No.: PCT/US2016/017186
§ 371 (c)(1),
(2) Date: Jul. 20, 2017

(87) PCT Pub. No.: WO2016/130571
PCT Pub. Date: Aug. 18, 2016

(65) Prior Publication Data
US 2018/0018509 A1      Jan. 18, 2018

Related U.S. Application Data

(60) Provisional application No. 62/176,108, filed on Feb. 9, 2015.

(51) Int. Cl.
*G06K 9/00* (2006.01)
*G07C 9/00* (2020.01)
(Continued)

(52) U.S. Cl.
CPC ......... *G06K 9/00348* (2013.01); *G01H 17/00* (2013.01); *G06K 9/00342* (2013.01);
(Continued)

(58) Field of Classification Search
CPC ................................................. G07C 9/00158
See application file for complete search history.

(56) References Cited

U.S. PATENT DOCUMENTS

| 8,271,204 B2 * | 9/2012 | Choi ...................... G01H 17/00 345/473 |
| 2010/0027378 A1 | 2/2010 | Sabatier et al. |

(Continued)

OTHER PUBLICATIONS

International Search Report dated Apr. 25, 2016 for International Patent Application No. PCT/US16/17186.

*Primary Examiner* — Sujoy K Kundu
*Assistant Examiner* — Terence E Stifter, Jr.

(57) ABSTRACT

This invention introduces an indoor person identification system that utilizes the capture and analysis of footstep induced structural vibrations. The system senses floor vibration and detects the signal induced by footsteps. Then the system then extracts features from the signal that represent characteristics of each person's unique gait pattern. With these extracted features, the system conducts hierarchical classification at an individual step level and at a collection of consecutive steps level, achieving high degree of accuracy in the identification of individuals.

25 Claims, 3 Drawing Sheets

(51) Int. Cl.
*G01H 17/00* (2006.01)
*G06F 16/683* (2019.01)
*G08B 13/14* (2006.01)
*G08B 13/10* (2006.01)
*G01V 1/00* (2006.01)
*G01V 1/30* (2006.01)

(52) U.S. Cl.
CPC .......... *G07C 9/00158* (2013.01); *G01V 1/001* (2013.01); *G01V 1/30* (2013.01); *G06F 16/683* (2019.01); *G06K 9/0053* (2013.01); *G08B 13/10* (2013.01); *G08B 13/14* (2013.01)

(56) References Cited

U.S. PATENT DOCUMENTS

| | | | |
|---|---|---|---|
| 2010/0260011 A1* | 10/2010 | Berger | G01V 1/30 367/38 |
| 2010/0268671 A1 | 10/2010 | Berger et al. | |
| 2011/0098994 A1* | 4/2011 | Cade | G01V 1/001 703/2 |
| 2014/0297221 A1 | 10/2014 | Wang et al. | |

\* cited by examiner

INDOOR IDENTIFICATION OF INDIVIDUALS THROUGH FOOTSTEP INDUCED STRUCTURAL VIBRATION

RELATED APPLICATIONS

This application claims the benefit of U.S. Provisional Patent Application Ser. No. 62/176,108, filed Feb. 9, 2015.

GOVERNMENT RIGHTS IN THE INVENTION

This invention was made with government support under National Science Foundation No. CNS-1149611. The government has certain rights in this invention.

CROSS-REFERENCE TO RELATED APPLICATIONS

This application is a national phase claiming the benefit of and priority to International Patent Application No. PCT/US 2016/017186, entitled "INDOOR IDENTIFICATION OF INDIVIDUALS THROUGH FOOTSTEP INDUCED STRUCTURAL VIBRATION," filed Feb. 9, 2016, which claims priority to Provisional U.S. Patent Application No. 62/176,108 filed Feb. 9, 2015, which are hereby incorporated by reference in their entireties.

BACKGROUND OF THE INVENTION

Many smart building applications require indoor identification of individuals for personalized tracking and monitoring services. For example, in a nursing home, identifying monitored patients and tracking individual activity range helps nurses understand the condition of patients. Similarly, such identification information can also be used in smart stores/malls to analyze shopping patterns of customers.

Various methods and apparatuses have been explored for identification of individuals. These methods and apparatuses utilize biometrics (face, iris, fingerprints, hand geometry, gait, etc.) and sensing technologies (vision, sound, force, etc.). Some biometrics, such as iris, fingerprints and hand geometry achieve relatively high identification accuracy and are widely used for access control. However, they often require human interactions, and, as such, they have limited usefulness for ubiquitous smart building applications. With other methods, such as facial and gait recognition, it is often difficult to get enough sensing resolution required for recognition from a distance, particularly when used in surveillance applications. Numerous sensing technologies have been explored and proven useful and efficient, but all have limitations. Vision-based methods often require line-of-sight, with performance dependent upon lighting conditions, and may require high computational costs, which limits their viability. Likewise, sound-based methods have limitations when deployed in conversation sensitive areas, as they are prone to be affected by ambient audio. Force-based methods typically utilize specialized floor tile sensors for footstep detection, resulting is the requirement for dense deployment at a high installation cost.

SUMMARY OF THE INVENTION

This invention performs identification of individuals via footstep induced structural vibration analysis. People walk differently, and therefore their footsteps result in unique structural vibrations. The invention measures these vibrations, detects signals induced by footsteps, extracts features from these signals, and applies a hierarchical classifier to these features to identify each registered user with a high confidence level.

Due to better wave attenuation properties in solids, with proper amplification, the invention can detect individuals at a relatively large range. As a result, the invention has a sensing density that is low compared to known force-based methods. Compared to vision-based and sound-based methods, the invention measurement suffers less interference from obstacles that move around, because the vibrations travel in the structure itself. Furthermore, the installation of the invention is non-intrusive, consisting of one or more geophones installed on or near the floor surface, which can be accomplished without alteration the structure.

DETAILED DESCRIPTION OF THE INVENTION

Each person has a unique walking pattern due to many factors, including, for example, individual physical characteristics, the center of gravity position during the walk, the way feet contact the ground, etc. Due to each person's unique walking pattern, there is a uniqueness and consistency of the footstep induced floor vibration for each person.

The floor vibration signal induced by a footstep is referred to herein as a step event. A sequence of step events from a continuous walk is referred to herein as a trace.

The floor vibration signal is captured by one or more sensing modules, each of which consists of three major parts: a geo-phone, an amplifier, and an analog-to-digital converter. The geophone is set on the floor of the structure to capture floor vibration signals. The analog signal is then amplified. In the preferred embodiment, the amplification is performed by connecting the geophone to an op-amp with an empirical amplification gain of approximately 1000, which allows approximately a sensing range of about 10 m for particular factors including floor type, shoe type, etc. However, as would be realized by one of skill in the art, many methods of amplification could be used. A sampling rate of 25 kHz allows the capture of a wide frequency range of signal characteristics, but other sampling rates could be used.

Figure 1:
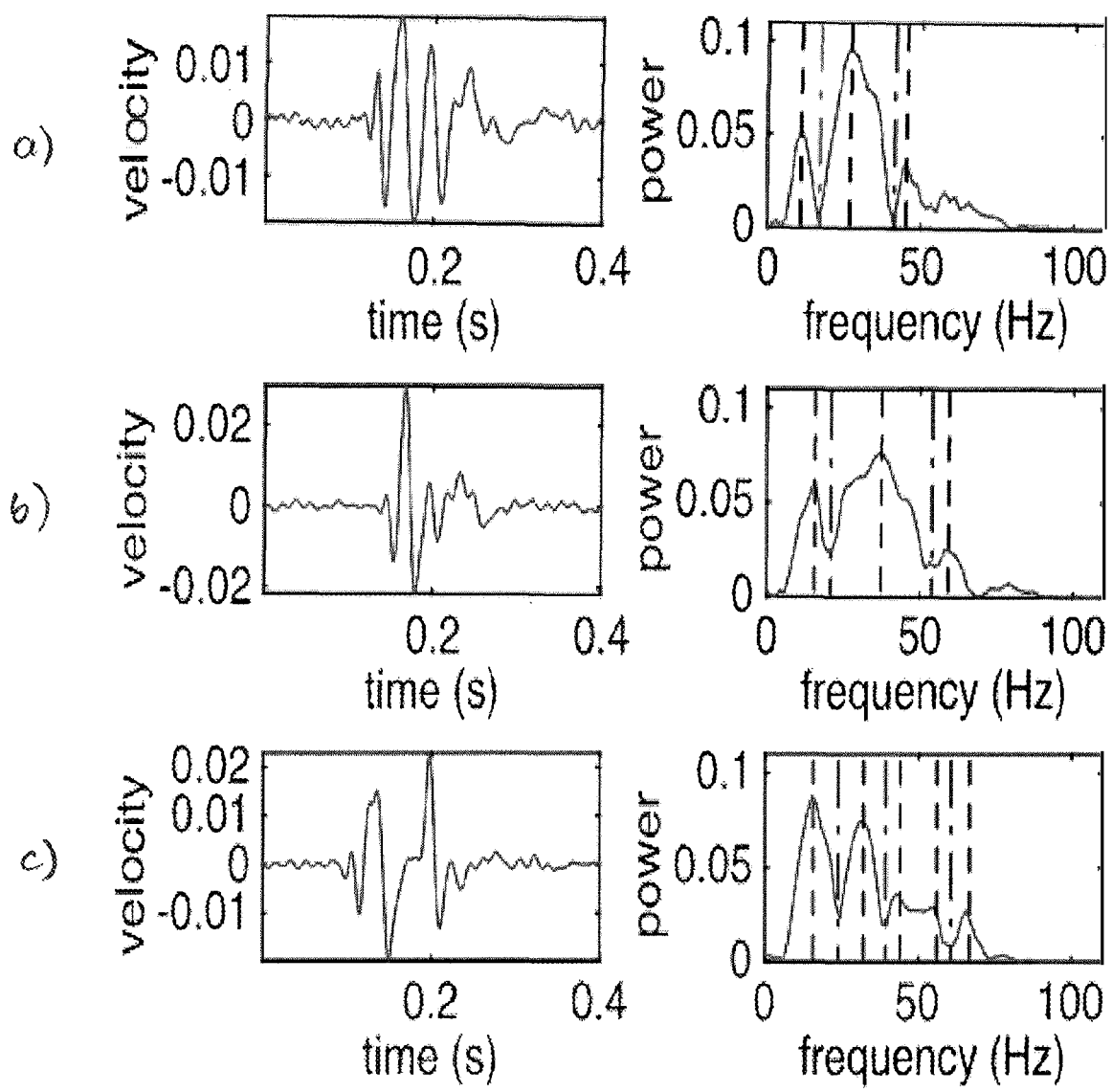
FIG. 1 shows recorded step events from three different people wearing soft-soled shoes, with each row showing a different person. The left column shows the time domain of the step event, while the right column shows the frequency domain of the same step event.

In tests of the system using this sensor module, step events from different people were recorded, showing distinguishable variations in both time and frequency domains. FIG. 1 shows step events from three people, labelled (a), (b) and (c). The left and right columns show corresponding time and frequency domain signals from the same step event for each person, respectively. In addition, dotted lines and dashed/dotted lines indicate locations of peaks and valleys in the frequency domain, respectively. As shown in FIG. 1, the locations of peaks and valleys vary among different people, which can be used as features to identify them.

Figure 2:
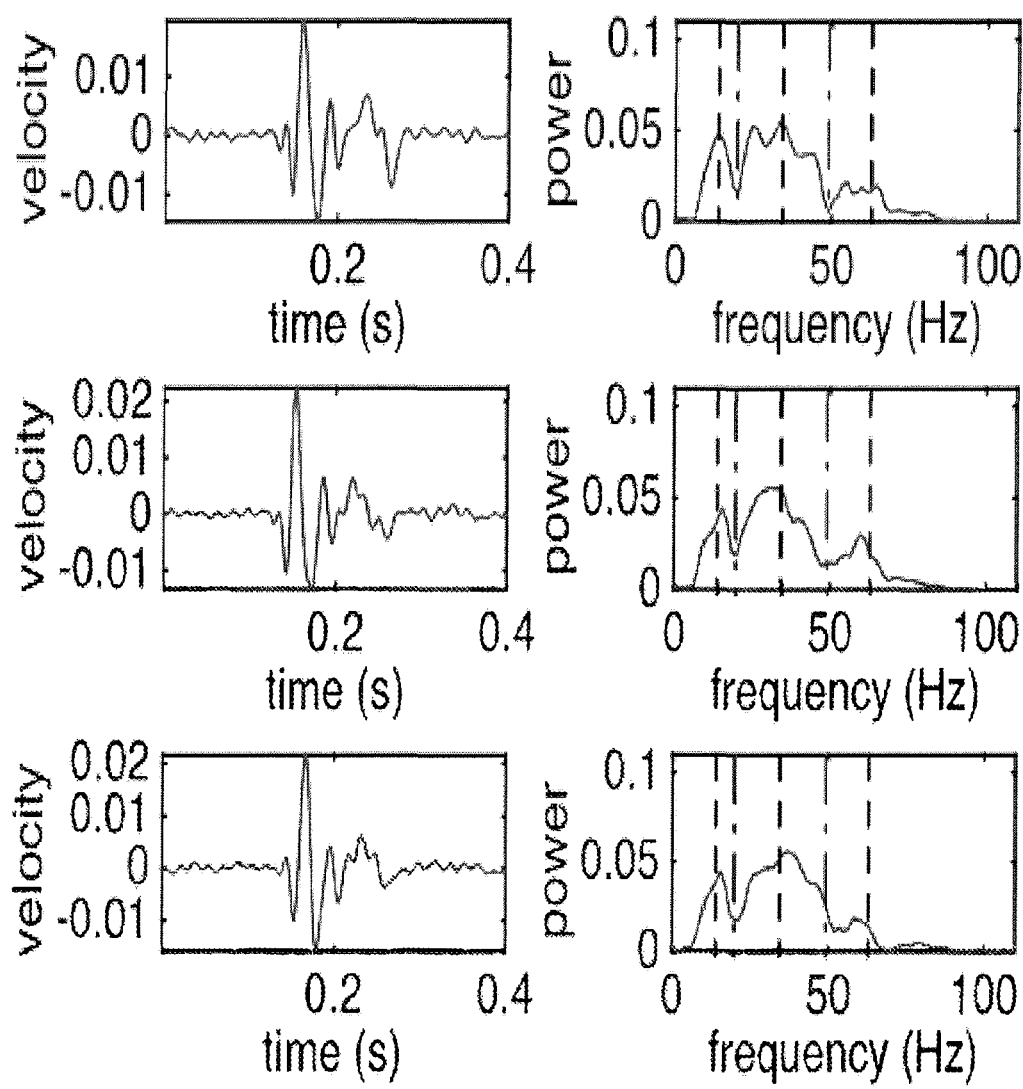
FIG. 2 shows three separate recordings of step events from the same person. The left column shows the time domain of the step event, while the right column shows the frequency domain of the same step event.

Step events from one person bear resemblance between each other. FIG. 2 shows three step events from one trace (i.e., from a series of steps by the same person). The left and right columns show corresponding time and frequency domain signals, respectively. Note that the step events span similar time duration with nearly identical velocity profiles in the time domain. The frequency domain patterns are well aligned across the three step events. This data demonstrates that a step event is a feasible metric for identification of individuals.

Figure 3:
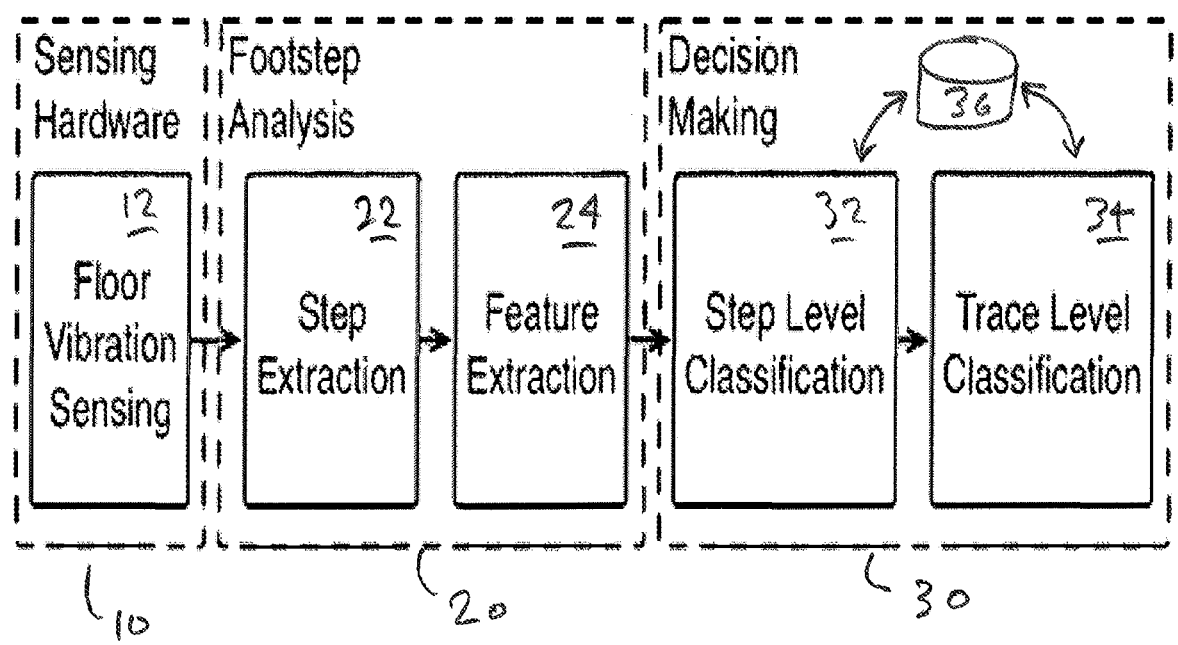
FIG. 3 presents the schematic overview of the components of the invention, highlighting the required functional modules.

As shown in FIG. 3, the identification system of the present invention contains three modules: sensing 10, footstep analysis 20, and decision-making 30. FIG. 3 displays the relations of these modules.

Sensing module 10 (described above) performs floor vibration sensing 12. The vibrations sensed are those that are induced by a person walking across a floor surface Sensing hardware 10 amplifies the signal received from the sensor and outputs a digital signal derived from the amplified analog output of the sensor. As discussed above, in a preferred embodiment of the invention, the sensor is a geophone of a type that is well known and commercially available, however, other types of sensors may be used. The system may use multiple sensing modules 10, depending upon the desired area of coverage.

Footstep analysis module 20 takes a trace of step events and extracts individual step events therefrom. Features representing characteristics of each step event are then extracted.

The key to identification of individuals is to extract and analyze the characteristics of step events. There are two major components in the footstep analysis module. The first is step extraction 22 to obtain step events, and the second is feature extraction 24, which characterizes step events via feature extraction.

Step events contain a person's identity information, while the interval between step events is mainly noise. Therefore, to identify people, step events need to be extracted from the trace containing the entire vibration signal by step extraction module 22. The noise is modeled as a Gaussian distribution, and then an anomaly detection method is used to extract step events. The threshold value to detect a step event is determined by an allowable false alarm rate.

Two detection algorithms have been developed for extracting step events from the trace containing the entire vibration signal. The first detection algorithm is threshold-based method and uses the time representation of the signal. This method finds the threshold using the background noise distribution and a footstep event is indicated whenever the energy of signal exceeds a defined threshold. The second detection algorithm uses the time-frequency representation of the signal. This approach is able to deal with signals with very low signal-to-noise ratio where it is difficult to differentiate between the background noise and footstep-induced vibrations and improves the accuracy by distinguishing between footsteps and other sources of non-stationary excitation. Some examples of such sources include vibrations induced by dropping an object and shutting a door. This algorithm uses the characteristics of structure to find the frequency components of the signal which are more robust to background noise. Furthermore, it includes a classification algorithm which distinguishes between footstep-induced vibrations and vibrations induced by non-stationary signals.

Feature extraction module 24, extracts features from selected step events. The events from which to the features are extracted are selected based on their signal to noise ratio. Features can be more efficiently extracted from step events in a trace having a high signal-to-noise ratio. Features of the selected steps are then extracted to characterize the footsteps.

Step events in one trace may have different signal-to-noise ratios depending on the relative distance of the location of each step event to a sensor. This leads to a variation in classification performance. A small number of step events closest to the sensor, and consequently with the highest signal-to-noise ratio, are selected for classification.

Once the step events are selected, they are normalized to remove effects of the distance between the footstep location and the sensor, and for different types of floor surfaces, for example, a hard floor versus a carpeted floor. Step events closer to the sensor have a higher signal energy, which is calculated as the sum of squared signal values. Each selected step event is divided by its signal energy to normalize for differences in the distance of each step event from the sensor, thereby removing the distance effect, the distance of each step event from the sensor is irrelevant to characterizing the step event for a particular person and contains no identify information.

After normalization, features are computed in both time and frequency domains to present different characteristics of step events for each person. Time domain features may include, but are not limited to standard deviation, entropy, peak values, partial signal before and after the maximum peak, etc. In the frequency domain, features may include, but are not limited to spectrum centroid, locations and amplitudes of peaks, power spectrum density, etc.

Once these features are extracted, decision-making module 30 takes the features and runs through a hierarchical classifier, which includes both step level classification 32 and trace level classification 34. The identification of individuals is modeled as a hierarchical classification problem in the invention. A hierarchical classifier includes step level classifications 32 and trace level classifications 34. Identification accuracy is increased by utilizing the fact that steps from the same trace belong to the same person. The classified step events are compared against a database 36 of previous step events from identified individuals to accurately identify the individual.

The system takes features of step events from different people's traces to generate a classification model using a Support Vector Machine, which maximizes the distance between data points and the separating hyper-plane. The step level classification 32 returns both the identification label and the confidence level from testing the step event.

By classifying identity at trace level 34, classification uncertainty is reduced by eliminating outlier step events from the step level classification 32, thereby enhancing the overall identification accuracy of the system.

Each step event classified obtains an identification label and a confidence level as the result of the step level classification 32. Since multiple steps events with the highest signal-to-ratio are referenced a confidence matrix $P_{s \times n}$ is created, where n is the number of people to be classified, and s is the number of step events selected from the trace. The identity of the step event with highest confidence level is selected to be the identity of the entire trace.

Achieving high accuracy for the classified step events is important. When a new person's trace is detected, it is possible that step events in the new trace are not similar to any of the footsteps in database 36. In this case, the confidence levels of all steps in a trace are equally low, and the system detects such situations. The confidence level threshold $CL_{threshold}$ is set to determine a reliable classification result. The trace is considered to be identifiable when the confidence level is higher than the confidence level threshold. Otherwise, the trace is determined to be unclassifiable (i.e., the trace of a previously un-identified person). The system can adjust this threshold to obtain different identification accuracy based on the application.

In tests of the system, various numbers of persons, and various types of structures were used, and the system was found to provide a high identification accuracy.

Many applications of the system have been identified in the areas of individual monitoring, analysis of group behavior and security.

Individual identification and monitoring can be used to detect children or elderly patients in an in-home setting, where the system can detect and identify individuals and respond accordingly, for example, if they appear alone in designated area (e.g., the kitchen or bathroom), or if they leave the premises. For elderly subjects, the system can be used to analyze walking patterns to predict fatigue level, which may be useful in and prevent fall events from occurring. Finally, individual identification can be used to identify individuals in a smart space, and personalize the environmental settings, for example, by detecting the identity of an individual as they walk through the front door, the smart system can start their computer before their arrival, then, by tracking the individual to the elevator, the smart system can play their favorite songs in the elevator. Likewise, the system could also set customized temperature, turn on lights, unlock doors, etc.

The system may also be applied to monitor and analyze group behavior. In a supermarket, shopping mall or airport environment, the system may recognize individual shopping patterns and understand the group shopping pattern based on the characterization from the footstep induced vibration signals (e.g., height, weight, gender, etc.). In a smart office type environment, the system could recognize the activity range of each individual and assign resources/space and manage energy consumption based on the optimized convenience.

Lastly, there are security applications for the system. For example, the system may be used to authorize access to a particular area by determining if the detected footsteps fit the profile of an authorized individual. The system may also be useful in theft detection, by detecting changes in the pattern of individual footsteps due to hidden objects on the body of the individual. Lastly, the system may be able to detect specific gait patterns due to individuals carrying weapons on their body.

Although the invention is illustrated and described herein with reference to specific embodiments, the invention is not intended to be limiting to the details shown. Rather, various modifications may be made in the details without departing from the invention.

We claim:

1. A system for identifying individuals in a structure comprising:
    a vibration sensor, disposed on a walking surface in the structure; and
    a processor, in communication with the vibration sensor, the processor running software performing the functions of:
        receiving, from the vibration sensor, a signal representing vibrations generated by one or more footsteps of the individual;
        extracting, from the signal, one or more discrete step events, each step event representing one footstep of the individual;
        extracting, from each of the one or more discrete step events, one or more features, the one or more features including both time domain features and frequency domain features; and
        identifying the individual, the identification being based wholly or partially on an analysis of the one or more features.

2. The system of claim 1 wherein the vibration sensor is a geophone positioned on a surface where the individual is walking.

3. The system of claim 1 wherein the signal from the vibration sensor is amplified before being communicated to the processor.

4. The system of claim 1 wherein the signal from the vibration sensor is digitized before being communicated to the processor.

5. The system of claim 1 wherein the discrete step events are extracted by:
    modeling intervals in the signal between discrete footsteps as noise modelled as a Gaussian distribution; and
    using an anomaly detection algorithm to extract the discrete step events.

6. The system of claim 1, the discrete step events extracted by an algorithm for detecting when the energy of the signal representing vibrations generated by the one or more footsteps of the individual exceeds a predefined threshold.

7. The system of claim 1, the discrete step events extracted by an algorithm to detect frequency components of the signal representing vibrations generated by one or more footsteps of the individual which are more robust to background noise, further comprising:
    classifying the detected frequency components as footstep-induced vibrations or vibrations induced by non-stationary signals.

8. The system of claim 1 wherein the features are extracted only from the discrete step events having a signal to noise ratio above a certain threshold.

9. The system of claim 8 wherein the discrete step events are normalized to compensate for distance from the vibration sensor of each footstep.

10. The system of claim 8 wherein the discrete step events are normalized to compensate for different floor surfaces.

11. The system of claim 1 wherein the time domain features are selected from a group consisting of standard deviation, entropy, peak values and partial signals before and after maximum peak values.

12. The system of claim 1 wherein the frequency domain features are selected from a group consisting of: spectrum centroid, locations and amplitudes of peaks and power spectrum density.

13. The system of claim 1 further comprising a database containing models of previously identified individuals, the models consisting of features previously extracted from discrete footstep signals of the individuals.

14. The system of claim 13 wherein the identification is based on a comparison of the features with the previously extracted features in the model stored in the database.

15. The system of claim 14 wherein the identification is based partially on an analysis of features extracted from the signal representing vibrations generated by one or more footsteps.

16. The system of claim 1 wherein signals representing vibrations generated by one or more footsteps of the individual are collected from two or more vibration sensors.

17. The system of claim 1 wherein identifying the individual further comprises:
   analyzing the one or more features using a hierarchical classifier to classify each discrete step event;
   assigning an identity of an individual and a confidence level to each step event; and
   identifying an individual as the individual associated with the step event having the highest confidence level.

18. The system of claim 17 wherein the hierarchical classifier classifies the one or more discrete step events and a trace comprising multiple step events.

19. A computer-implemented method for identifying an individual in a structure based on vibrations generated by footsteps comprising the steps of:
   collecting a signal representing one or more footsteps of the individual from a vibration sensor disposed on a walking surface within the structure;
   extracting, from the signal, one or more discrete step events, each step event representing one footstep of the individual;
   extracting, from each of the one or more discrete step events, one or more features, the one or more features including both time domain features and frequency domain features; and
   identifying the individual, the identification being based wholly or partially on an analysis of the one or more features.

20. The method of claim 19 wherein the identification is made by comparing the one or more features to a model of the individual stored in a database.

21. The method of claim 20 further comprising the steps of
   selecting the discrete step events having the highest signal to noise ratio; and
   extracting the features only from the selected discrete step events.

22. The system of claim 21 further comprising the step of normalizing the selected discrete step events to compensate for distance from the vibration sensor of each footstep prior to extracting the features from the discrete step events.

23. The method of claim 19 wherein the identifying step includes an analysis of features extracted from the signal representing vibrations generated by one or more footsteps.

24. The method of claim 19 wherein identifying the individual further comprises:
   analyzing the one or more features using a hierarchical classifier to classify each discrete step event;
   assigning an identity of an individual and a confidence level to each step event; and
   identifying an individual as the individual associated with the step event having the highest confidence level.

25. The method of claim 24 wherein the hierarchical classifier classifies the one or more discrete step events and a trace comprising multiple step events.

* * * * *